United States Patent
Anderson

(10) Patent No.: US 6,598,934 B1
(45) Date of Patent: Jul. 29, 2003

(54) VEHICLE SEAT ARMREST MOUNTED TRAY TABLE

(75) Inventor: Rick A. Anderson, Grand Haven, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/890,512

(22) PCT Filed: Feb. 8, 2000

(86) PCT No.: PCT/US00/03207

§ 371 (c)(1),
(2), (4) Date: Jul. 31, 2001

(87) PCT Pub. No.: WO00/47440

PCT Pub. Date: Aug. 17, 2000

Related U.S. Application Data

(60) Provisional application No. 60/119,334, filed on Feb. 9, 1999.

(51) Int. Cl.$^7$ .................................................. B60N 2/46
(52) U.S. Cl. ................... 297/162; 297/188.15; 297/145
(58) Field of Search ................................. 297/145, 160, 297/162, 188.15, 411.32, 173

(56) References Cited

U.S. PATENT DOCUMENTS

| | | | | |
|---|---|---|---|---|
| 4,244,623 A | * | 1/1981 | Hall et al. | 297/162 |
| 4,881,778 A | * | 11/1989 | Stephenson et al. | 297/411.39 |
| 5,451,092 A | * | 9/1995 | Gray | 297/162 |
| 6,220,616 B1 | * | 4/2001 | Finch | 297/411.32 |
| 6,220,658 B1 | * | 4/2001 | Lukawski et al. | 297/145 |

* cited by examiner

*Primary Examiner*—Peter R. Brown
(74) *Attorney, Agent, or Firm*—Foley & Lardner

(57) ABSTRACT

A tray table mounted to the armrest of a vehicle seat assembly via a four-bar linkage. The linkage operates to raise the armrest during movement of the tray table between its stowed and use positions. Raising the armrest provides increased clearance between the tray table and the vehicle floor and between the tray table and the seat back of the next forward seat assembly. A second four-bar linkage is provided to maintain the armrest in a fixed attitude relative to the vehicle body regardless of the seat back recline angle. This enables the tray table to remain in a given attitude relative to the vehicle body, such as a horizontal attitude, regardless of the seat back recline position.

20 Claims, 3 Drawing Sheets

VEHICLE SEAT ARMREST MOUNTED TRAY TABLE

This application claims the benefit of Provisional Application No. 60/119,334 filed Feb. 9, 1999.

TECHNICAL FIELD OF THE INVENTION

The present invention relates to a vehicle seat tray table and in particular to a tray table mounted to the armrest of a vehicle seat for use by the seat occupant.

BACKGROUND AND SUMMARY OF THE INVENTION

Vehicle manufacturers are continually striving to include additional features in motor vehicles that provide greater convenience for a vehicle user. A tray table for use by a seat occupant is one feature that has not been widely used in motor vehicles. While such tray tables are commonly available in airplane seating, packaging issues have prevented their widespread use in motor vehicles.

The present invention addresses these issues by providing a tray table mounted to a vehicle seat armrest. The tray table has a stowed position extending downwardly below the armrest body. The tray table moves from the stowed position beneath the armrest to a use position forward of the armrest body and extending horizontally over the lap of a seat occupant. Several possible points of interference exist in the deployment of the tray table from its stowed position to its use position. One possible point of interference occurs in the rotation of the tray table forward from beneath the armrest, where the tray table may contact the vehicle floor. A second possible point of interference occurs with the forward rotation of the tray table, where the tray table may contact the seat back of the next forward vehicle seat. One way to avoid these interference points is to reduce the size of the tray table. However, a tray table which can be rotated from the stowed position to the use position without any interference must be reduced in size to the degree where it is of limited use as a tray table.

The present invention addresses these interference issues by providing a tray table which is mounted to the armrest via a four-bar mechanism. The armrest serves as one link of the four-bar mechanism. During deployment of the tray table, the armrest is raised from its generally horizontal use position. Once the tray table has been rotated forward and upward, the armrest then returns to its generally horizontal use position, leaving the deployed tray table in a generally horizontal use position over the lap of the seat occupant. By raising the armrest, the pivot point about which the tray table rotates forward is sufficiently high that interference with the vehicle floor is avoided. Raising the armrest also causes the tray table pivot to move rearward. This allows the tray table to continue to rotate forward and upward, without interfering with the seat back of the seat in front of the tray table.

As an additional feature of the invention, the armrest is coupled to the seat back and seat base via a second four-bar mechanism, forming a parallelogram. This enables the armrest to maintain a relatively constant attitude regardless of the recline or dump position of the seat back. As a result, the tray table remains substantially horizontal over the lap of the seat occupant, regardless of the angle of the seat back.

The tray table of the present invention is designed for use within a captain's chair, such as that used within a van or sport utility type vehicle. However, the tray table is not limited to use in such applications. The tray table is particularly well suited for use in a second or third row captain's chair and is preferably mounted to the inboard armrest of the seat assembly. However, the invention is not limited to use at an inboard armrest.

Other objects and advantages of the present invention will become apparent to those skilled in the art upon reading the following detailed description and upon reference to the following drawings.

DETAILED DESCRIPTION OF THE PREFERRED EMBODIMENT

The following description of the preferred embodiment is merely exemplary in nature, and is in no way intended to limit the invention or its application or uses.

Figure 1:
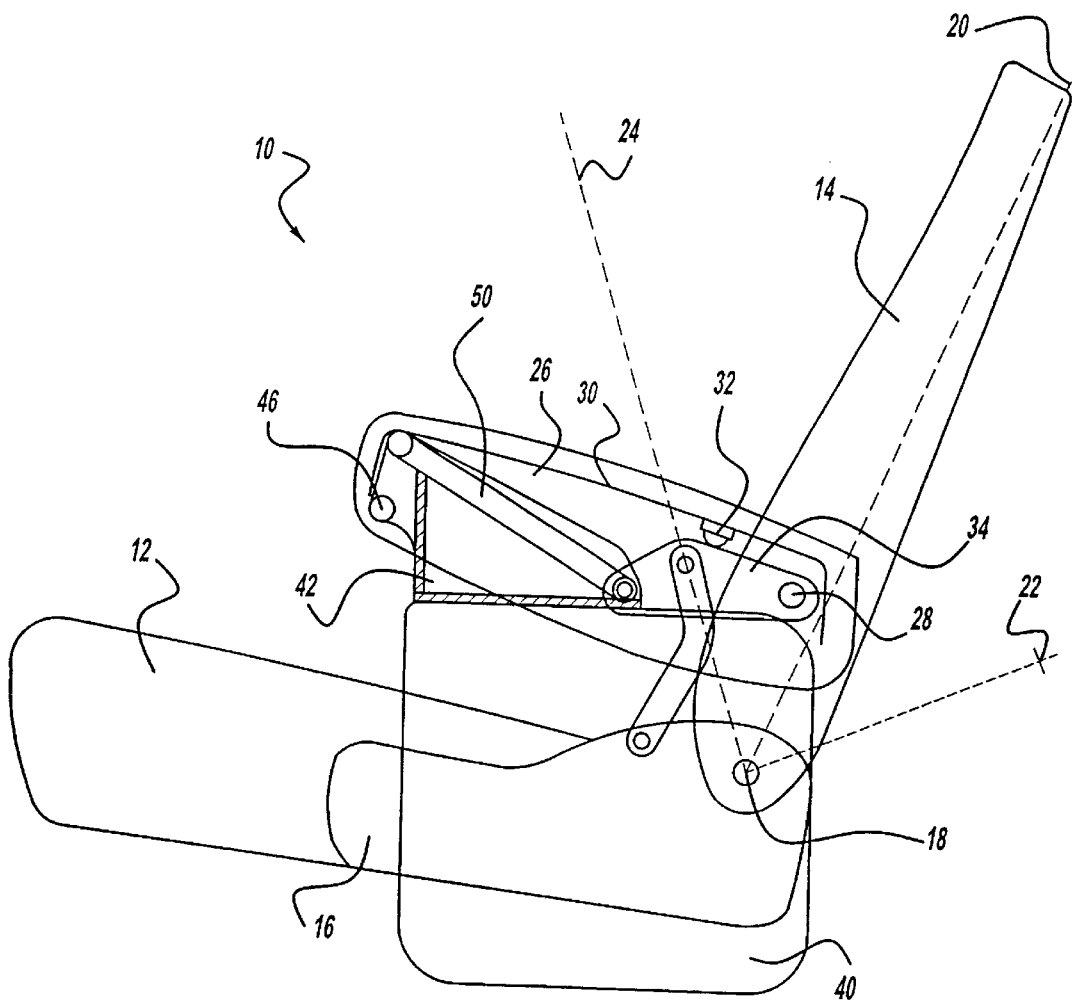
FIG. 1 is a side view of the seat assembly of the preferred embodiment of the invention, shown with the tray table in a stowed position.

The vehicle seat assembly having the tray table of the present invention is shown in the figures and designated generally at 10. As shown in FIG. 1, the seat assembly 10 includes a generally horizontal seat cushion 12 and a seat back 14 extending generally upwardly at the rear end of the seat cushion 12 in a conventional manner for a vehicle seat assembly. The seat cushion 12 and the seat back 14 are coupled to a base 16 which forms a part of the seat assembly 10.

The seat back 14 is pivotally mounted to the base 16 for rotation about a seat back pivot 18. The seat back 14 is shown in a generally upright position indicated by the center line 20. The seat back 14 can be rotated rearward to a reclined position shown by the center line 22. The seat back 14 can also be rotated forward to a dump position shown by the center line 24.

Figure 2:
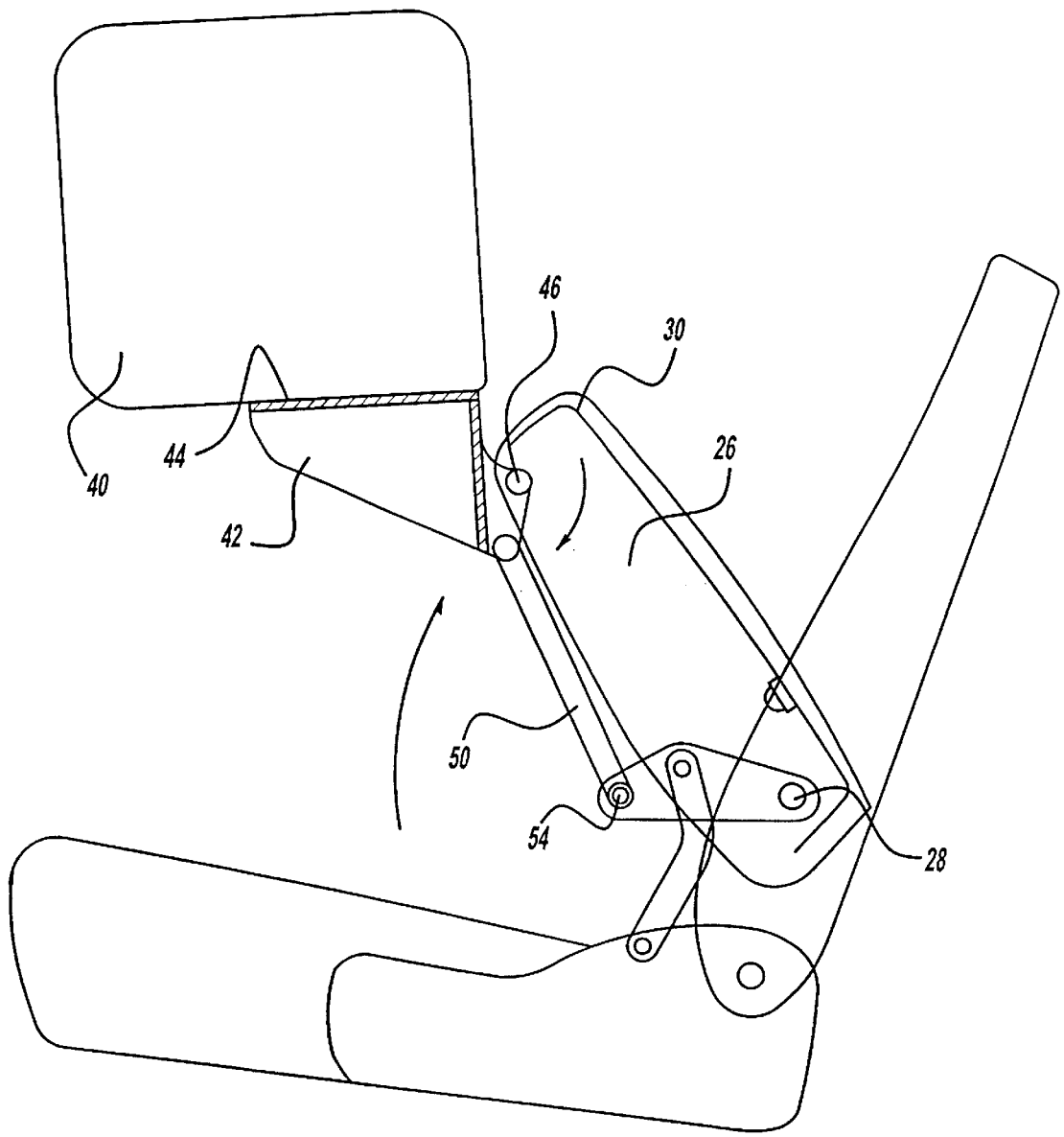
FIG. 2 is a side view of the seat assembly of FIG. 1, shown with the tray table in an intermediate position.

An armrest 26 is mounted to the seat back 14 for rotation about an armrest pivot 28. The armrest 26 is rotatable about the armrest pivot 28 from a generally horizontal use position to a raised position (as shown in FIG. 2). The armrest 26 includes an armrest frame 30 which gives the armrest 26 its structure. The armrest frame 30 includes a stop 32 which rests against a support bracket 34 when the armrest 26 is in the generally horizontal use position. A bias member, such as a spring or gas cylinder, may be provided to bias the armrest 26 down, such that the stop 32 presses against the support bracket 34. A spring, such as a torsion spring, placed about the armrest pivot 28 may be used to bias the armrest 26 down. Alternatively, a gas cylinder may be provided between the support bracket 34 and the armrest frame 30 or between the seat back 14 and the armrest frame 30.

Figure 3:
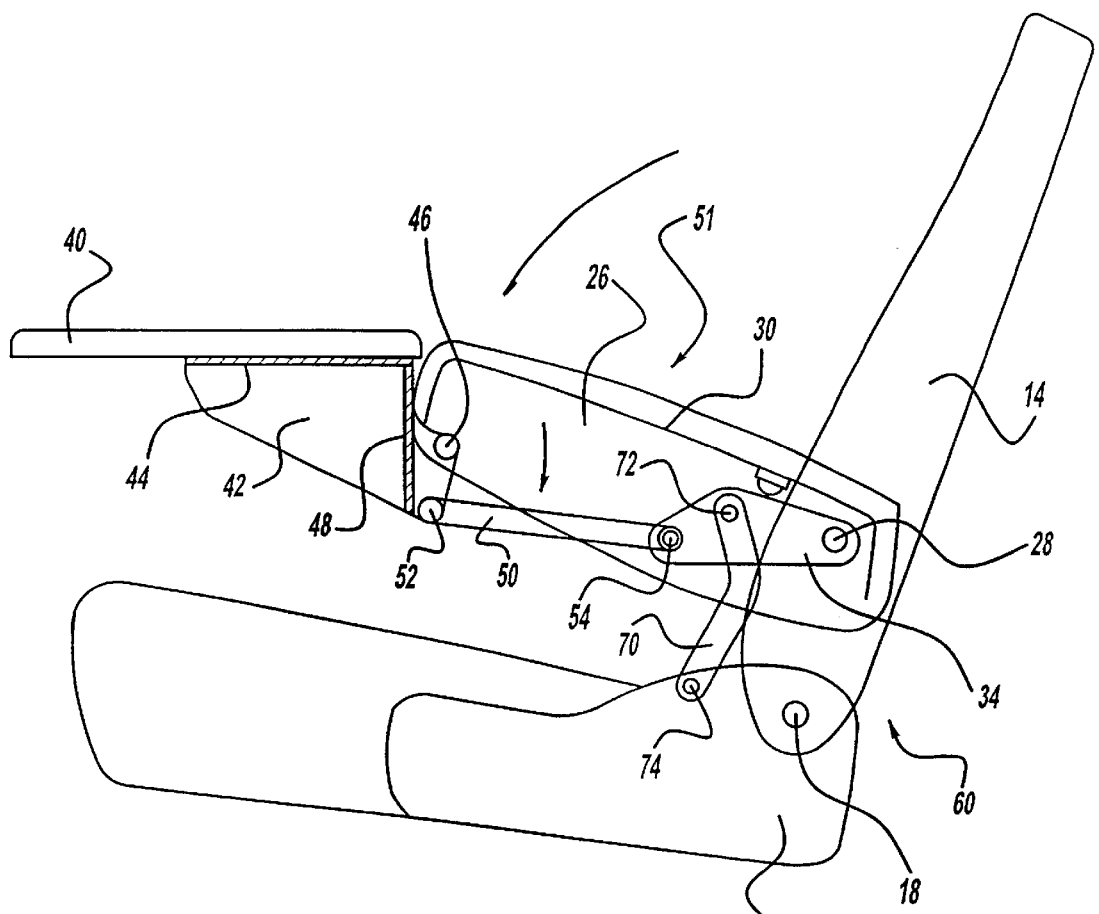
FIG. 3 is a side view of the seat assembly of FIG. 1, shown with the tray table in a use position.

The seat assembly 10 includes a tray table 40 shown in a stowed position in FIG. 1, extending downward from the armrest 26. As shown in an intermediate position in FIG. 2, the tray table 40 is rotatably coupled to a tray table bracket 42 by a tray table hinge 44. The tray table hinge 44 is shown as a two-piece piano hinge but it is understood that other types of pivot joints could be used as well. The tray table bracket 42 is pivotally mounted to the armrest frame 30 by a tray table pivot 46. The tray table bracket 42 rotates about the tray table pivot 46 approximately 180° from the stowed position (shown in FIG. 1) to a use position (shown in FIG. 3). As shown in FIG. 1, the tray table 40 is generally parallel with the tray table bracket 42 in the stowed position. As shown in FIG. 3, once the tray table bracket 42 has been rotated to its use position, the tray table 40 is rotated about the tray table hinge 44 approximately 90° to its use position, extending over the lap of the seat occupant. The tray table hinge 44 may include a detent mechanism to hold the tray table 40 in position relative to the tray table bracket 42 when the tray table 40 is in the stowed position. A rotational stop may be provided to hold the tray table 40 substantially horizontal in the use position.

The tray table bracket 42 is a two-piece bracket having a break away portion 48 between the tray table pivot 46 and the tray table 40. In the use position of the tray table, the break away portion 48 is approximately vertical. The break away portion 48 is provided to enable the tray table 40 to rotate laterally out of position and away from the seat occupant in the event of a vehicle collision. The break away portion 48 is also shown as a piano hinge but other pivot joints can be utilized here as well. The break away portion 48 is preferably provided with a detent mechanism to hold the two pieces of the tray table bracket 42 stationary during normal use conditions.

The tray table hinge 44 or the stop to hold the tray table 40 horizontal in the use position, may have a break away feature that allows the tray table 40 to rotate downward if a large downward load is applied to the tray table 40. Such a load may occur if a child were to sit upon the tray table 40 in the use position.

The tray table bracket 42 is coupled to the support bracket 34 by a first link 50. The first link 50 is coupled to the tray table bracket 42 at a first pivot 52, spaced from the tray table pivot 46 of the tray table bracket 42. The opposite end of the first link 50 is attached to the support bracket 34 by a second pivot 54. The first link 50 is translatable from a stowed position (shown in FIG. 1) through an intermediate position (shown in FIG. 2) to a use position.

The support bracket 34, the first link 50, the tray table bracket 42, and the armrest frame 30 form a first four-bar mechanism 51. To move from the stowed position to the use position, the tray table bracket 42 must rotate approximately 180° about the tray table pivot 46. For this to occur, the first pivot 52 must pass between the tray table pivot 46 and the second pivot 54. In order to provide sufficient distance between the second pivot 54 and the tray table pivot 46 for this to occur, the armrest 26 must be rotated into the raised position (shown in FIG. 2). This lifting of the armrest 26 occurs as the tray table 40 is being moved between the stowed and use positions.

The effect of raising the armrest 26 is that the tray table pivot 46 is raised, which provides increased clearance between the tray table 40 and the vehicle floor. In addition, the raising of the armrest 26 moves the tray table pivot 46 rearward, away from the seat back of the next forward seat assembly. This provides greater clearance for the tray table 40 to move between its stowed and use positions.

Since the seat back 14 is rotatable about the seat back pivot 18 to recline the seat back 14 rearward or dump the seat back 14 forward, it is important to provide a mechanism in which the armrest 26 can maintain a fixed attitude. This enables the tray table 40 to remain substantially horizontal when in its use position. This is accomplished by way of a second four-bar mechanism 60 which is formed by the support bracket 34, the seat back 14, the base 16, and a second link 70. The second link 70 is located forward of the seat back 14 and is coupled to the support bracket 34 by a third pivot 72 and is coupled to the base 16 by a fourth pivot 74. The second four-bar mechanism 60 functions as a parallelogram to maintain the fixed attitude of the armrest 26 and the support bracket 34, regardless of the angle of the seat back 14. Thus, as the seat back 14 is rotatated rearward to its reclined position, the support bracket 34 rotates counter-clockwise about the armrest pivot 28 to maintain the attitude of the support bracket 34 relative to the vehicle body. In the event the tray table 40 is incorporated into a seat assembly having a fixed seat back, the second link 70 to maintain the armrest attitude would not be necessary.

The tray table 40 of the present invention utilizes a pair of four-bar mechanisms to accomplish two purposes. The first four-bar mechanism 51 enables the tray table 40 to rotate between its stowed and use positions and provide adequate clearance between the tray table 40 and the vehicle floor and between the tray table 40 and the seat back in front of the tray table 40. The second four-bar mechanism 60 provides for maintenance of the tray table 40 in a given attitude, such as a horizontal attitude, over the lap of a seat occupant.

In addition to providing the seat assembly 10, the present invention also provides a new and useful method of manufacturing the seat assembly 10. This method includes providing the seat cushion 12 and connecting the seat cushion 12 to the vehicle, providing the seat back 14 and coupling the seat back 14 to the seat cushion 12, providing the armrest 26 and connecting the armrest 26 to the seat back 14 for rotational movement about the armrest pivot 28 between a generally horizontal use position and a raised position, and providing the tray table 40 and coupling the tray table 40 to the armrest 26 for rotational movement about the tray table pivot 46 between a stowed position and a use position. This method is accomplished such that rotation of the tray table 40 from the stowed position to the use position causes rotation of the armrest 26 from the generally horizontal use position to the raised position with movement of the tray table pivot 46 in an upward and rearward direction, which provides a greater clearance for the rotation of the tray table 40. The method of the present invention is a time-efficient and cost-effective way to produce the seat assembly 10.

The method of manufacturing the seat assembly 10 may also include providing the first four-bar mechanism 51 and the second four-bar mechanism 60. The first four-bar mechanism 51, as discussed above, is defined by the armrest 26 between the armrest pivot 28 and the tray table pivot 46, the tray table bracket 42 between the tray table pivot 46 and the first pivot 52, the first link 50 between the first pivot 52 and the second pivot 54, and the support bracket 34 between the second pivot 54 and the armrest pivot 28. The second four-bar mechanism 60 is defined by the seat back 14 between the seat back pivot 18 and the armrest pivot 28, the support bracket 54 between the armrest pivot 28 and the third pivot 72, the second link 70 between the third pivot 72 and the fourth pivot 74, and the base 16 between the fourth pivot 74 and the seat back pivot 18.

It is to be understood that the invention is not limited to the exact construction illustrated and described above, but that various changes may be made if not thereby departing from the scope of the invention as defined in the following claims.

I claim:

1. A seat assembly for a vehicle, comprising:
   a seat cushion connected to the vehicle;
   a seat back coupled to said vehicle cushion;
   an armrest connected to said seat back for rotational movement about an armrest pivot between a generally horizontal use position and a raised position; and a tray table coupled to said armrest by a tray table bracket for rotational movement about a tray table pivot between a stowed position and a use position;

the tray table bracket coupled to the vehicle by a first link having a first pivot and a second pivot and configured for one or more of translational and rotational movement such that rotation of said tray table from the stowed position to the use position causes rotation of said armrest from the generally horizontal use position to the raised position with movement of said tray table pivot in an upward and rearward direction, which provides greater clearance for the rotation of said tray table.

2. The seat assembly of claim 1 further comprising a tray table hinge for connecting said tray table to said tray table bracket.

3. The seat assembly of claim 2 further comprising a break away portion having a pivot joint on said tray table bracket located between said tray table pivot and said tray table hinge.

4. The seat assembly of claim 2 wherein the tray table hinge comprises a detent mechanism to position the tray table.

5. The seat assembly of claim 1 further comprising a support bracket for connecting said first link to the vehicle, said support bracket being connected to said first link and to said seat back and configured for pivotal movement relative to the seat back.

6. The seat assembly of claim 5 further comprising a first four-bar mechanism defined by said armrest between said armrest pivot and said tray table pivot, said tray table bracket between said tray table pivot and said first pivot, said first link between said first pivot and said second pivot, and said support bracket between said second pivot and said armrest pivot.

7. The seat assembly of claim 6 wherein said seat back is coupled to said seat cushion for rotational movement about a seat back pivot from a generally upright position to a reclined position.

8. The seat assembly of claim 7 further comprising a second link connected to said support bracket for rotational movement about a third pivot and coupled to the vehicle for rotational movement about a fourth pivot, such that said tray table, when rotated into the use position, remains substantially horizontal during the rotation of said seat back.

9. The seat assembly of claim 8 further comprising a base for connecting said seat back and said second link to said seat cushion.

10. The seat assembly of claim 9 further comprising a second four-bar mechanism defined by said seat back between said seat back pivot and said armrest pivot, said support bracket between said armrest pivot and said third pivot, said second link between said third pivot and said fourth pivot, and said base between said fourth pivot and said seat back pivot.

11. The seat mechanism of claim 1 wherein the tray table bracket is rotatable through a range of approximately 180 degrees.

12. A method of manufacturing a seat assembly for a vehicle, comprising:

providing a seat cushion and connecting the seat cushion to the vehicle;

providing a seat back and coupling the seat back to the seat cushion;

providing an armrest and connecting the armrest to the seat back for rotational movement about an armrest pivot between a generally horizontal use position and a raised position; and providing a tray table and coupling the tray table to the armrest by a tray table bracket for rotational movement about a tray table pivot between a stowed position and a use position, where the tray table bracket is coupled to the vehicle by a first link having a first pivot and a second pivot and configured for one or more of translational and rotational movement;

such that rotation of the tray table from the stowed position to the use position causes rotation of the armrest from the generally horizontal use position to the raised position with movement of the tray table pivot in an upward and rearward direction, which provides a greater clearance for rotation of the tray table.

13. The method of manufacturing a seat assembly of claim 12 further comprising providing a tray table hinge and connecting the tray table hinge to the tray table and to the tray table bracket.

14. The method of manufacturing a seat assembly of claim 13 further comprising providing a break away portion having a pivot joint on the tray table bracket located between the tray table pivot and the tray table hinge.

15. The method of manufacturing a seat assembly of claim 12 further comprising providing a support bracket and connecting the support bracket to the first link and to the seat back where the support bracket is configured for pivotal movement relative to the seat back.

16. The method of manufacturing a seat assembly of claim 15 further comprising providing a first four-bar mechanism defined by the armrest between the armrest pivot and the tray table pivot, the tray table bracket between the tray table pivot and the first pivot, the first link between the first pivot and the second pivot, and the support bracket between the second pivot and the armrest pivot.

17. The method of manufacturing a seat assembly of claim 16 further comprising coupling the seat back to the seat cushion for rotational movement about a seat back pivot from a generally upright position to a reclined position.

18. The method of manufacturing a seat assembly of claim 17 further comprising:

providing a second link, connecting the second link to the support bracket for rotational movement about a third pivot, and coupling the second link to the vehicle for rotational movement about a fourth pivot, such that the tray table, when rotated into the use position, remains horizontal during the rotation of the seat back.

19. The method of manufacturing a seat assembly of claim 18 further comprising providing a base and connecting the base to the seat back, the second link, and the seat cushion.

20. The method of manufacturing a seat assembly of claim 19 farther comprising providing a second four-bar mechanism defined by the seat back between the seat back pivot and the arm rest pivot, the support bracket between the armrest pivot and the third pivot, the second link between the third pivot and the fourth pivot, and the base between the fourth pivot and the seat back pivot.

* * * * *